US008853305B2

United States Patent
Hampel et al.

(10) Patent No.: US 8,853,305 B2
(45) Date of Patent: Oct. 7, 2014

(54) SETTING RETARDER FOR HYDRATE-FORMING BINDERS

(75) Inventors: Christina Hampel, Rutihof (CH); Joerg Zimmermann, Winterthur (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/978,793

(22) PCT Filed: Mar. 8, 2012

(86) PCT No.: PCT/EP2012/054052
§ 371 (c)(1),
(2), (4) Date: Jul. 9, 2013

(87) PCT Pub. No.: WO2012/123340
PCT Pub. Date: Sep. 20, 2012

(65) Prior Publication Data
US 2013/0289169 A1   Oct. 31, 2013

(30) Foreign Application Priority Data
Mar. 11, 2011   (EP) ..................................... 11157796

(51) Int. Cl.
*C04B 24/28*   (2006.01)
(52) U.S. Cl.
USPC .............................................. 524/5; 528/327
(58) Field of Classification Search
CPC ...... C04B 28/14; C04B 24/287; C04B 24/14; C04B 24/04
USPC .............................................. 524/5; 528/327
See application file for complete search history.

(56) References Cited

U.S. PATENT DOCUMENTS

| 6,673,206 B1 | 1/2004 | Linhart et al. |
| 2011/0056409 A1 | 3/2011 | Winkler et al. |

FOREIGN PATENT DOCUMENTS

| DE | 199 40 955 A1 | 3/2001 |
| EP | 1 136 459 A1 | 9/2001 |
| EP | 1 321 445 A1 | 6/2003 |
| EP | 2 108 628 A1 | 10/2009 |
| WO | WO 2009/124993 | * 4/2009 .............. C04B 24/04 |

OTHER PUBLICATIONS

International Preliminary Report on Patentability issued in International Patent Application No. PCT/EP2012/054052 dated Sep. 17, 2013.
International Search Report issued in International Patent Application No. PCT/EP2012/054052 dated May 31, 2012.

* cited by examiner

*Primary Examiner* — John Uselding
(74) *Attorney, Agent, or Firm* — Oliff PLC

(57) ABSTRACT

A method for producing a setting retarder for hydrate-forming binders, wherein a) a first reactant A, comprising an amino acid and/or an amino acid derivative, is reacted with b) a second reactant C, including an amine-free carboxylic acid and/or an amine-free carboxylic acid derivative, to form a reaction product, characterized in that the reaction is carried out at a pH value of 7.5-11.5 and the pH value is held constant in the specified range of 7.5-11.5 during the reaction. In order to hold the pH value constant in the specified range and to avoid fluctuations, in one process step an aqueous solution of reactant A is prepared and a pH of 7.5-11.5, preferably 8-11, in particular 8.5-10.5, is set by adding a base.

13 Claims, 1 Drawing Sheet

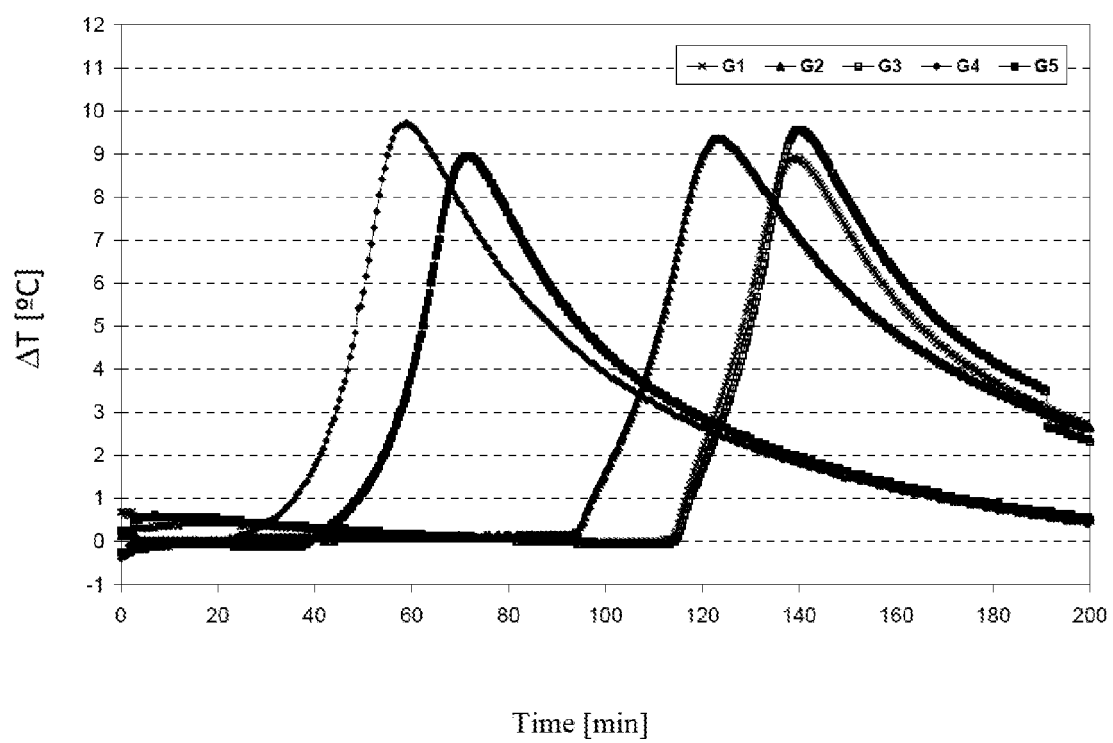

SETTING RETARDER FOR HYDRATE-FORMING BINDERS

FIELD OF THE INVENTION

The invention relates to a method for producing a setting retarder for hydrate-forming binders, and to a corresponding setting retarder. The invention further relates to a binder composition containing a setting retarder and to a method for producing said binder composition. A further aspect of the invention involves the use of the setting retarder to retard the start of setting of hydrate-forming binders.

BACKGROUND OF THE INVENTION

Large quantities of hydrate-forming binders, such as cement, lime and gypsum materials, for example, are used in the construction industry.

As gypsum materials, calcined gypsum and plaster are used, either alone or in combination with lime, sand and lightweight aggregates. However, the setting times for these gypsum materials once they have been mixed with water are relatively short, so that, unless additional measures are implemented, processing must be carried out very quickly. However, it is known to delay the onset of solidification of gypsum materials by mixing these materials with setting retarders, thereby improving their processability. Known setting retarders include, for example, fruit acids, such as tartaric acid and citric acid, but also protein hydrolyzates, such as the commercially available Plast Retard L (obtainable from Sicit 2000 S.p.A.).

In this connection, EP 2 108 628 A1 (Tricosal GmbH) describes, for example, a setting retarder in the form of an adduct based on an amino acid compound and a carboxylic acid or a carboxylic acid derivative. This adduct is produced by reacting an amino acid compound with a carboxylic acid or a carboxylic acid derivative in an aqueous solution.

Although known setting retarders are highly effective, the need still exists for an improved setting retarder which will further retard, in particular, the onset of solidification after being mixed with water.

SUMMARY OF THE INVENTION

The problem addressed by the present invention is therefore that of devising an improved setting retarder and a method for producing the same. In particular, the setting retarder that can be produced according to the invention is intended to delay the onset of solidification of hydrate-forming binders, in particular, gypsum, for as long as possible. The method is further intended to enable the most reliable, reproducible and safe production of an improved setting retarder that is possible.

The problem relating to methods is solved according to the invention by the features of claim 1. The problem relating to the setting retarder is solved by the features of claim 13.

The main feature of the method according to the invention is that the reaction of the two reactants A and C is carried out at a pH value of 7.5-11.5, preferably 8-11, in particular, 8.5-10.5. This means, in particular, that the pH value is held constant within the specified range during the reaction. This remains true for the entire duration of the reaction of the two reactants A and C. It has unexpectedly been found that setting retarders produced in this manner are capable of significantly delaying the onset of solidification of hydrate-forming binders, in particular, gypsum, as compared with setting retarders produced according to known methods. This is true, in particular, for setting retarders in the form of di products, in particular, diamides. Furthermore, the method according to the invention has proven to be extremely reliable and easy to implement. In particular, the method according to the invention enables the reproducible production of setting retarders having improved efficacy.

Further aspects of the invention are the subject matter of additional independent claims. Particularly preferred embodiments of the invention are the subject matter of the dependent claims.

IMPLEMENTATION OF THE INVENTION

A first aspect of the invention relates to a method, in particular, for producing a setting retarder for hydrate-forming binders, wherein
  a) a first reactant A, comprising an amino acid and/or an amino acid derivative, is reacted with
  b) a second reactant C, comprising an amine-free carboxylic acid and/or an amine-free carboxylic acid derivative,
to form a reaction product, wherein the reaction is carried out at a pH value of 7.5-11.5, preferably 8-11, in particular 8.5-10.5.

The expression "hydrate-forming binder" in the present context refers particularly to binders which react in the presence of water in a hydration reaction to form solid hydrates or hydrate phases. These can be, for example, hydraulic binders (e.g., cement or hydraulic lime), latent hydraulic binders (e.g., slag or fly ash) or non-hydraulic binders (gypsum or white lime).

The hydrate-forming binder preferably comprises or consists of gypsum. The term "gypsum" in this context refers to any known form of gypsum, in particular, calcium sulfate-α-hemihydrate, calcium sulfate-β-hemihydrate, calcium sulfate anhydrite and/or mixtures thereof. In the present context, calcium sulfate-β-hemihydrate has proven particularly advantageous.

The binder can also be a mixture of one or more hydrate-forming binders with aggregates such as sand, gravel and/or ground stone.

The term "reaction" in the present case refers particularly to a chemical reaction of the two reactants A and C in which a chemical bond, preferably a covalent chemical bond, between reactants A and C is formed.

Reactant A comprises an amino acid and/or an amino acid derivative. This can be, for example, a protein hydrolyzate, a pure amino acid, an amino acid mixture, and/or hydrochlorides thereof. Reactant A can also be a mixture of an amino acid and/or an amino acid derivative with additional compounds. Reactant A advantageously consists of an amino acid.

In the present context, the term "amino acid" is understood, in particular, as a compound having at least one carboxyl group (—COOH) and at least one amine group (—NH$_2$), which are present, in particular, as zwitterionic ammonium carboxylate. Particularly suitable are α-amino acids terminated by a carboxyl group and, directly adjacent thereto, a vicinal amine group or an amine group in the α-position. In this case, the carboxyl group can be deprotonated, for example, and can optionally have added counterions, such as metal cations, for example. The amine group can also be present in protonated form.

According to one preferred embodiment, the amino acid has precisely one carboxyl group and precisely two amine groups. As mentioned above, these can be present in protonated and/or deprotonated form. In this manner, reactant C can be used to produce di products, which have proven to be particularly effective setting retarders.

The amino acid is chosen, in particular, from the group consisting of alanine, arginine, asparagine, aspartic acid, cysteine, glutamine, glutamic acid, glycine, histidine, isoleucine, leucine, lysine, lysine hydrochloride, methionine, phenylalanine, proline, serine, threonine, tryptophan, tyrosine, valine and/or aminobutanoic acid.

In one particularly preferred embodiment, the amino acid is lysine and/or threonine. Lysine is particularly preferred. With such amino acids, in particular with lysine, the advantages according to the invention are particularly obvious.

Reactant C comprises an amine-free carboxylic acid and/or an amine-free carboxylic acid derivative. The term "carboxylic acid" within the context of this invention stands, in particular, for a mono-, di- or polycarboxylic acid. In this context, a monocarboxylic acid comprises precisely one carboxyl group, whereas the dicarboxylic acid has precisely two thereof, and the polycarboxylic acid contains at least three carboxyl groups. The carboxyl group can be present, for example, in deprotonated form, and can optionally have added counterions, such as metal cations, for example.

The carboxylic acid in the present case is an amine-free carboxylic acid. In other words, this means that the carboxylic acid is not derived from an amino acid and/or does not contain an amine group. Accordingly, the amine-free carboxylic acid derivative also does not contain an amine group.

With particular preference, amine-free dicarboxylic acids and/or derivatives thereof, in particular, inner acid anhydrides of dicarboxylic acids, are used. The corresponding reaction with reactant C, e.g., an amino acid such as lysine, then results in a simple manner in a reaction product which contains free carboxyl groups, which has proven advantageous in the present context.

Reactant C can be a pure amine-free carboxylic acid and/or a pure amine-free carboxylic acid derivative, for example. Also possible are mixtures of various amine-free carboxylic acids and/or amine-free carboxylic acid derivatives. Reactant C can also be present in the form of a mixture with other compounds. Preferably, however, an amine-free carboxylic acid and/or an amine-free carboxylic acid derivative is used as compound C.

An amine-free carboxylic acid derivative is preferably chosen from the group consisting of carboxylic acid anhydrides, carboxylic acid halides and/or carboxylic acid esters.

In particular, the amine-free carboxylic acid and/or the amine-free carboxylic acid derivative is chosen from the group consisting of oxalic acid, acetic acid, propionic acid, 1,3-dipropionic acid, butanoic acid, succinic acid, maleic acid, fumaric acid, phthalic acid, pyromellitic acid, malic acid, tartaric acid, citric acid and/or the acid halides, acid anhydrides and/or esters of the specified compounds.

It has been found that reactant C advantageously comprises an amine-free carboxylic acid derivative, in particular, an amine-free carboxylic acid anhydride. With particular preference, the carboxylic acid anhydride is succinic acid anhydride. In particular, when combined with amino acids having two amine groups, e.g., lysine, particularly effective setting retarders of high purity can be produced in high yield.

Reactants A and C are reacted, in particular, to form an amide, preferably a diamide. With particular preference, reactants A and C are reacted to form a di product, wherein, in particular, 1.5-3 mol reactant C, e.g., succinic acid anhydride, are reacted per 1 mol reactant A, in other words, lysine, for example. More preferably, 1.8-2.5 mol, particularly preferably 2.0 mol reactant C, are reacted per 1 mol reactant A.

It has been found that the reaction can be advantageously carried out at a temperature of 20-60° C., preferably 35-55° C., particularly preferably 40-50° C. Within such temperature ranges, in the pH range according to the invention, particularly high yields of well-defined reaction products can be obtained.

Reaction is carried out, in particular, in an aqueous solution.

In particular, at least one base is added to the reaction mixture. Suitable bases include alkali hydroxides, earth alkali hydroxides and/or earth alkali oxides, for example. The at least one base advantageously comprises NaOH, KOH, $Ca(OH)_2$, and/or CaO, and is particularly added in the form of an aqueous solution. Bases of this type have proven particularly suitable in the present context. Suitable concentrations of aqueous solutions are, e.g., 40-60 wt/% base in water. However, in principle, other bases can also be used. In some cases, however, the reaction is impeded thereby.

According to one preferred embodiment, the base comprises or consists of NaOH and/or KOH. NaOH is preferred. With this embodiment, liquid setting retarders can be efficiently produced.

In another preferred embodiment, the base comprises or consists of CaO and/or $Ca(OH)_2$. Mixtures of CaO and/or $Ca(OH)_2$ with NaOH and/or KOH can also optionally be used. It has been found that with this variant, by drying the setting retarder once the reaction is complete, e.g., by spray drying, a solid, in particular, powdered product can be obtained.

Depending on the storage conditions and the use of the setting retarder, either a setting retarder in liquid form or a setting retarder in solid or powdered form can be advantageous.

In particular, reactants A and C, and optionally the base are metered in during the reaction in such a way that the pH value of the reaction solution remains constant during the reaction, within the range of 7.5-11.5, in particular 8-11, particularly preferably 8.5-10.5. According to a particularly advantageous embodiment, in a first process step an aqueous solution of reactant A is prepared and is set to a pH of 7.5-11.5, in particular 8-11, particularly preferably 8.5-10.5 by adding base. In a further process step, partial quantities of base and partial quantities of reactant C are advantageously added alternatingly. The partial quantities are measured, in particular, such that the pH value of the reaction solution remains within the range of 7.5-11.5, in particular 8-11, particularly preferably 8.5-10.5 during the reaction. In this manner, pH value fluctuations can be optimally compensated for, thereby improving the yield of the reaction and ultimately increasing the efficacy of the setting retarder.

However, it is also possible to add reactant A and/or reactant C and/or the optionally used base continuously. In this case, the pH value can be regulated, e.g., by using different addition rates, or can be held constant within the range of 7.5-11.5, in particular 8-11, particularly preferably 8.5-10.5. The aqueous solution of the setting retarder obtained in this manner can be used immediately following completion of the reaction. It is not necessary to process the reaction solution after production of the setting retarder.

Optionally, the liquid setting retarder produced in this manner can be subjected to a further process step, a drying process, preferably a spray drying process. This is carried out, in particular, if the reaction is run using one or more earth alkali hydroxides and/or earth alkali oxides, e.g., CaO and/or $Ca(OH)_2$, as a base. The setting retarder can thereby be converted in a more effective manner to a paste-like or solid substance, in particular, a powdered product.

Suitable drying methods are known to a person skilled in the art. With the spray drying, which in this connection is particularly advantageous, the product to be dried is ordinarily introduced via a nozzle or a rotating disk atomizer into a hot air stream, where it can be dried to a fine powder and can be separated and removed, for example, by means of a centrifugal separator.

When spray drying is carried out, it can be advantageous to add at least one spray additive, preferably chosen from the group consisting of limestone dust, lignin sulfonate, talcum, silicic acid, polyacrylates and/or polyvinyl alcohols, before and/or during spray drying.

A further aspect of the invention relates to a method for producing a hydrate-forming binder composition, wherein a setting retarder is produced as described above and is mixed with a hydrate-forming binder, in particular, gypsum.

Referred to 100 wt/% of the hydrate-forming binder in dry form, 0.001-0.5 wt/%, preferably 0.001-0.1 wt/% of the setting retarder is advantageously added.

The invention further relates to a setting retarder, in particular, for hydrate-forming binders, which can be obtained by the method described above. Setting retarders of this type have proven particularly effective, as compared with setting retarders produced according to known methods. It has been found that the two reactants A and C can be made to react, resulting in high yields when a suitable reaction is run. The percentage of ineffective secondary products or secondary products that decrease the retarding effect in the setting retarder (e.g., unreacted reactants A and C) can thereby be kept extremely low. Referred to the total molar amount of the setting retarder, the setting retarder advantageously consists of at least 90 mol/%, preferably at least 95 mol/%, particularly preferably at least 98 mol/% of the reaction product of the two reactants A and C.

In this connection, the reaction product is particularly preferably a di product, formed from two molar fractions of reactant C with one molar fraction of reactant A. The di product is particularly a diamide, formed from two molar fractions of succinic acid anhydride and one molar fraction of lysine. Based upon the reaction according to the invention, the di product or diamide can thereby be obtained in high yield, wherein the ratio of unreacted reactants A, C and/or mono products (e.g., consisting of one molar fraction of lysine and one molar fraction of succinic acid anhydride) in the setting retarder is extremely low. Surprisingly, the retarding effect of the setting retarder according to the invention can be significantly improved in this manner.

The pH value of the setting retarder advantageously ranges from 7-11, in particular, 8-9. An optimal retarding effect in hydrate-forming binders, in particular, gypsum is achieved in this manner.

If desired, one or more additives from the list consisting of rheologic agents, solvents, defoaming agents, accelerators, fillers, drying agents, dyes, preservatives, rust inhibitors, hydrophobing agents and/or pigments can be added to the setting retarder.

Particularly advantageously, a preservative is added to the setting retarder. This allows its storage stability to be significantly improved.

In one preferred embodiment, the setting retarder is provided in liquid form. According to another advantageous embodiment, the setting retarder consists of a paste-like or solid product, in particular, a powder.

A further aspect of the invention relates to a binder composition containing a setting retarder according to the invention and a hydrate-forming binder, in particular, gypsum. Referred to 100 wt/% of the hydrate-forming binder in dry form, the binder composition advantageously contains 0.001-0.5 wt/%, preferably 0.001-0.1 wt/% of the setting retarder. Based on the setting retarder produced according to the invention, binder compositions of this type, after being mixed with water, can be processed for unexpectedly long periods of time before the binder begins to set.

It is also possible to mix the additives specified above in connection with the setting retarder with the binder composition.

Binder compositions of this type harden after the addition of water, forming hydrate phases. Molded bodies can therefore be produced by mixing a binder composition with water and then hardening it. A binder composition mixed with water can, in principle, be cast into any mold, so that molded bodies of nearly any shape can be produced.

The setting retarder is suitable, in particular, for retarding the setting of hydrate-forming binders or compositions. The setting retarder is added before, during and/or after preparation of the hydrate-forming binder or the hydrate-forming composition.

Additional advantageous embodiments and combinations of features of the invention are specified in the following embodiment examples and in the totality of the patent claims.

BRIEF DESCRIPTION OF THE DRAWINGS

FIG. 1, which is used to illustrate embodiment examples, shows the temperature development of aqueous gypsum mixtures having different setting retarders as a function of time.

EXAMPLES

Production Example 1

In a first process step, 320 g lysine (reactant A) were placed in a reaction vessel at room temperature and 792 g water were added with agitation. Diluted base in the form of a solution of 50 wt/% NaOH in water was then added until the reaction solution reached a pH of 10.5. The temperature of the mixture was then adjusted to approximately 45° C.

In a subsequent process step, partial quantities of succinic acid anhydride (reactant C) and diluted base (50 wt/% NaOH in water) were then added alternatingly, so that the pH value of the reaction solution remained consistently within the range of 8.5-10.5. The temperature during addition was held constant within a range of 40-50° C. The total quantity of succinic acid anhydride added was 220.8 g, and the total quantity of diluted base added was 264 g (including the base added during the first process step). The pH value of the reaction solution once the total amount of succinic acid anhydride and the total amount of diluted base had been added was 8-9.

The reaction solution was then agitated at a temperature of 40-50° C. for approximately 30 minutes longer, and was then cooled with agitation.

Solutions produced in this manner can be used directly, without further processing, as setting retarders in hydrate-forming binders. In the following, these are referred to as setting retarder AE1.

Production Example 2

Comparison Example

For purposes of comparison, a further setting retarder was produced in a manner similar to production example 1. In contrast to production example 1, however, the total quantity of diluted base was added in a single portion directly in the first process step. In the second process step, the total quantity of succinic acid anhydride was then also added in one portion. The pH value of the reaction solution at the start of the reaction was significantly above 11.5, and then dropped rapidly during the reaction, within only a few minutes, to an inert level, to a value significantly below 7.5, with a temperature increase in the reaction solution. The setting retarder produced in this manner is referred to in the following as setting retarder AV.

Production example 2 corresponds essentially to the method described in EP 2 108 628 A1.

Production Example 3

In a first process step, 800 g lysine (reactant A) were placed in a reaction vessel at room temperature, and 2000 g water were added with agitation. 50 g Ca(OH)$_2$ were then added. The pH value of the solution following the addition of Ca(OH)$_2$ was between 10 and 11.5. The temperature of the mixture was then adjusted to approximately 45° C.

In a subsequent process step, partial quantities of succinic acid anhydride (reactant C) and diluted base (50 wt/% NaOH in water) were then added alternatingly, so that the pH value of the reaction solution was held continuously within a range of 8.5-10.5. The temperature during addition was held constant within a range of 40-50° C. The total quantity of succinic acid anhydride added was 552 g, and the total quantity of diluted base added was 650 g. The pH value of the reaction solution once all the succinic acid anhydride and all the diluted base had been added was 7-8.

The reaction solution was then agitated for approximately 30 min. longer at a temperature of 40-50° C., and was then cooled with agitation.

Solutions produced in this manner can be converted in a spray dryer to a powder, which is referred to in the following as AE2.

Comparison Experiments with Gypsum

The efficacy of various setting retarders in aqueous gypsum mixtures was tested.

To produce the gypsum mixtures, calcium sulfate-β-hemihydrate (alabaster gypsum Almod BCL8098) was slurried at room temperature with water in a weight ratio of water to gypsum=0.6, and was mixed with 0.02 wt/% Amylotex (a thickener having a starch ether base, e.g., available from Aqualon). The quantity of Amylotex was referred in each case to the calcium sulfate-β-hemihydrate. For this purpose, each of the setting retarders listed in Table 1 below was mixed in a concentration of 0.029 wt/%, referred to the calcium sulfate-β-hemihydrate. All the gypsum mixtures were produced under essentially identical conditions to form the various setting retarders.

TABLE 1

Produced gypsum mixtures

| Gypsum mixture | Setting retarder |
|---|---|
| G1 | AE1 (according to production example 1) |
| G2 | AV (according to production example 2) |
| G3 | AE2 (according to production example 3) |
| G4 | Retardan L (commercially available from Sika Deutschland GmbH) |
| G5 | Plast Retard L (commercially available from Sicit 2000 S.p.A.) |

The temperature development of freshly prepared gypsum mixtures G1-G5 was then measured in a known manner as a function of time. FIG. 1 shows the corresponding temperature profiles. The x-axis in this FIGURE indicates the time elapsed since the production of the respective gypsum mixture G1-G5, while the y-axis indicates the temperature difference from the temperature of the freshly produced gypsum mixture (room temperature). All the measurements were carried out under essentially identical conditions.

As is clear from FIG. 1, gypsum mixtures G1 and G3 with setting retarders AE1 and AE2 according to the invention have the best retarding effects. A significant increase in temperature and therefore the start of setting of the respective gypsum mixture is not observed until approx. 115 min. have elapsed. Setting retarder AE2 (gypsum mixture G3) is even more effective than setting retarder AE1 (gypsum mixture G1). The remaining gypsum compositions G2, G4 and G5, all of which contain conventional setting retarders, are capable of delaying the start of setting by only 95 min. at best. Therefore, the setting retarders produced according to the invention enable an extension of the processing time by at least 20% over known retarders.

The above-described embodiment examples are intended merely as illustrative examples, which can be modified in any way within the scope of the invention.

For example, it is possible to use a different amino acid and/or amino acid derivative, such as threonine, for example in place of or in addition to lysine. In place of or in addition to succinic acid anhydride, another carboxylic acid derivative and/or a carboxylic acid can also be used. The setting retarders can also be used in hydrate-forming binders other than gypsum, for example.

It can also be advantageous to mix additives, particularly preservatives, in with the setting retarders according to the invention. Suitable substances are known to a person skilled in the art.

The invention claimed is:

1. A method for producing a setting retarder for hydrate-forming binders, comprising:
    reacting a first reactant A, comprising an amino acid and/or an amino acid derivative, with a second reactant C, comprising an amine-free carboxylic acid and/or an amine-free carboxylic acid derivative, in a reaction mixture to form a reaction product, the reaction mixture further containing at least one base; and
    alternatingly adding partial quantities of the at least one base and partial quantities of the second reactant C to the reaction mixture so that the reaction is carried out at a pH value in a range of from 7.5-11.5.

2. The method according to claim 1, wherein the first reactant A comprises an amino acid, and the amino acid is lysine and/or thereonine.

3. The method according to claim 1, wherein the second reactant C comprises an amine-free carboxylic acid derivative.

4. The method according to claim 3, wherein the amine-free carboxylic acid derivative is a carboxylic acid anhydride.

5. The method according to claim 1, wherein the first reactant A and the second reactant C are reacted to form an amide.

6. The method according to claim 1, wherein the reaction is carried out at a temperature in a range of from 20-60° C.

7. The method according to claim 1, wherein the at least one base comprises at least one member selected from the group consisting of alkali hydroxides, earth alkali hydroxides and earth alkali oxides.

8. The method according to claim 1, further comprising first preparing an aqueous solution of the reactant, and then setting the pH range of the reaction mixture to the range of from 7.5-11.5 by adding the at least one base to the reaction mixture.

9. The method according to claim 1, further comprising drying the reaction mixture.

10. The method according to claim 1, wherein the pH value of the reaction mixture is held constant within the range of from 7.5-11.5 during the reaction.

11. A method for producing a hydrate-forming binder, composition, comprising:
   producing a setting retarder according to the method of claim 1; and
   mixing the setting retarder with a hydrate-forming binder.

12. The method according to claim 4, wherein the carboxylic acid anhydride is succinic acid anhydride.

13. The method according to claim 7, wherein the at least one base comprises at least one member selected from the group consisting of NaOH, KOH, CaO and $Ca(OH)_2$.

* * * * *